United States Patent Office 2,957,776
Patented Oct. 25, 1960

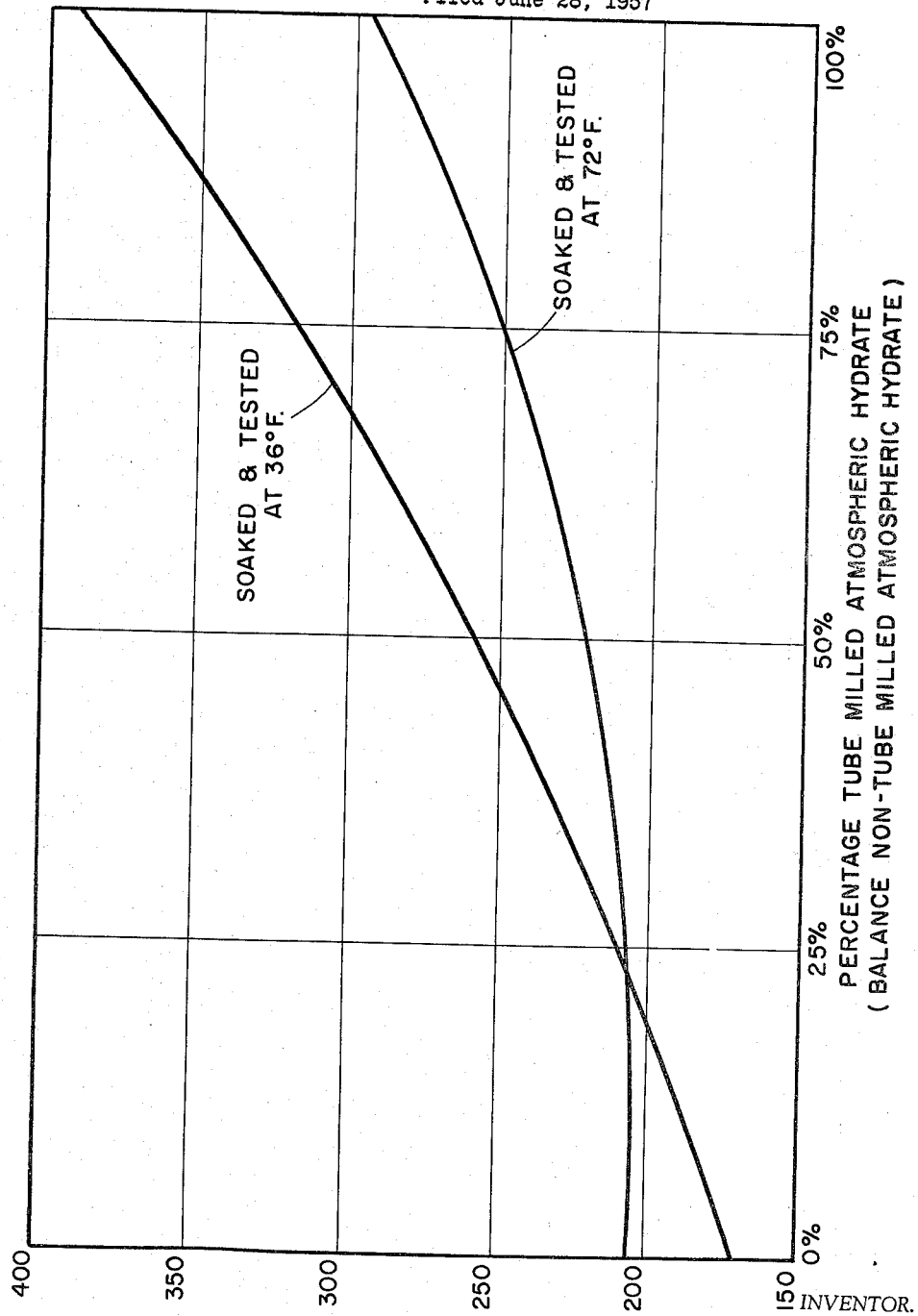

2,957,776
HYDRATED LIME

Joseph Volk, North Tonawanda, N.Y., assignor to National Gypsum Company, Buffalo, N.Y., a corporation of Delaware Filed June 28, 1957, Ser. No. 668,772

2 Claims. (Cl. 106—118)

This invention relates to hydrated lime and particularly to a method of making a temperature-stabilized, atmospherically-hydrated, dolomitic lime.

Two common quicklimes include high-calcium quicklime, CaO, and dolomitic quicklime, a mixture or combination of CaO and MgO. Hydration of either high calcium or dolomitic quicklime at atmospheric pressures converts the CaO to $Ca(OH)_2$, but does not, in the case of the dolomitic quicklime, alter the MgO. Hydration of the dolomitic lime under super-atmospheric pressures is well known for producing a pressure-hydrated dolomitic lime, or special hydrate, which is essentially a combination of $Ca(OH)_2$ and $Mg(OH)_2$. Dolomitic lime, hydrated at atmospheric pressures, commonly known as regular, normal or atmospheric-hydrate, is hereinafter referred to as atmospheric-hydrate, $Ca(OH)_2$ and MgO, and that hydrated under pressure, as pressure-hydrate, $Ca(OH)_2$ and $Mg(OH)_2$.

The use of tube-milling for improving the instantaneous plasticity of the hydrated high-calcium lime or the pressure-hydrate is well known. Tube-milling atmospheric-hydrate has been investigated heretofore in regard to the effectiveness insofar as the instantaneous plasticity thereof. Such tube-milling of atmospheric-hydrate, however, was found to have very detrimental effects on the soaking qualities of the lime. As a result, there has since been little, if any commercial tube-milling of atmospheric-hydrate.

A plasticity of 200, as measured by the known Emley plasticimeter, is a standard requirement for hydrated lime to be used as a finishing lime for structural purposes. With atmospheric-hydrate, this plasticity is generally achieved under normal conditions only after the required soaking period of sixteen hours or more, as specified.

It is also known, however, that even after 24 hours of soaking, the plasticity of much of the commercially available atmospheric-hydrate is often below the required 200, and especially so when soaking and application is performed at very low temperatures, just above 32° F. It is not uncommon to experience these lower temperatures in present day plastering practices.

It is an object of the present invention to provide an atmospheric-hydrate having improved plasticity when soaked and used at low temperatures.

It is a further object of the invention to provide an atmospheric hydrate which will be stabilized in respect to plasticity, whereby acceptable and substantially constant plasticity is obtained at all common soaking and application temperatures.

These and other objects and advantages of the invention will appear more fully when considered in connection with the following detailed description of preferred embodiments of the invention, and the accompanying drawing wherein a graphical representation is shown of the plasticity of the ingredients and the mixture embodying the present invention.

Briefly, the present invention contemplates the admixture in dry powder form of a portion of non-tube-milled atmospheric-hydrate with a portion of tube-milled atmospheric-hydrate to provide a resultant product of improved characteristics, not obvious from the prior knowledge and experience of the art. Tube-milling is best defined as a process of localized-compression of a product which, depending upon the type and size of the raw material tube milled, may produce either a reduction or an increase in the particle size of the material being milled, the latter being the result of agglomeration. Ball-milling and rod-milling are common forms of tube-milling. Although fine-ground pressure-hydrates are commonly tube-milled to provide improved characteristics, such as plasticity, atmospheric-hydrates, when heretofore subjected to tube-milling, have been so treated mainly for obtaining fineness, and such treatment has now been substantially replaced by other particle-size reducing means, such as hammer-milling.

Tube-milled atmospheric-hydrate, whether previously hammer-milled or not, is a less desirable building lime than non-tube-milled atmospheric-hydrate which has been reduced to the desired fineness by hammer-milling. All atmospheric-hydrates require at least 16 hours soaking in water to obtain a putty having a plasticity of at least 200 as required for building purposes. Pressure-hydrates are tube-milled to provide a product of substantially instantaneous plasticity, eliminating the need of long soaking. Tube-milling atmospheric-hydrates is substantially ineffective in regard to length of soak required, in fact, the soaking properties of tube-milled atmospheric-hydrate are such that it is difficult to obtain an even textured soaked product without excessive manual working of the slurry during such a 16-hour or more soak.

All references hereabove to soaking of dry atmospheric-hydrate in water have been with reference to soaking at normal temperatures, in the order of 72° F.

It has now been found that tube-milled atmospheric-hydrate, when soaked at low temperatures, in the order of 36° F., provides a putty which, although having the above mentioned unacceptable soaking properties, has unusually high plasticity. A typical example of the plasticities of tube-milled and non-tube-milled atmospheric hydrates at 72° F. and at 36° F. is as follows:

| | Regular Atmospheric-Hydrate | Tube-Milled Atmospheric-Hydrate |
|---|---|---|
| 16 hour soaking and testing at 72° F | 207 | 295 |
| 16 hour soaking and testing at 36° F | 172 | 389 |

It might appear from the above data that there, thus, might be provided an improved stable hydrate by some form of reducing the effect of tube-milling, but such has not been found to be true.

It has been found, however, that mixtures of the above-said regular and tube-milled atmospheric-hydrates do provide generally proportional plasticities, as shown in the drawing, and as will be seen from the drawing, variation in the above proportions will, when so graphed, indicate, as discussed further below, one ratio of the proportions whereat the plasticity of cold-soaked atmospheric-hydrate is equal to the plasticity of normal-temperature-soaked atmospheric-hydrate. In the example set forth in the drawing, a mixture of 23% by weight tube-milled atmospheric-hydrate and 77% by weight regular atmospheric-hydrate provides the most temperature-stabilized form of the particular lime therein employed.

Referring to the drawing, two curves are shown which show the Emley plasticity of the above discussed typical example of an atmospherically-hydrated dolomitic lime, plotted versus the percentage tube-milled atmospheric-hydrate mixed therein. The two curves, as identified in the drawing, represent such plasticity respectively when soaked and tested at 36° F. and when soaked and tested at 72° F. It will be noted that at, except for one point where the two curves cross, the plasticity, of a mixture of a given percentage of tube-milled hydrate, will vary with change in temperature.

The drawing shows, at 0%, a standard atmospheric-hydrate which, at 36° F., has an unacceptably low plasticity. The 100% tube-milled atmospheric-hydrate, although high in plasticity, is, as discussed above, completely unacceptable in regard to soaking properties. Mixtures containing from 5% to 75% tube-milled atmospheric-hydrate provide substantially improved stability of plasticity and satisfactory and acceptable soaking properties, in accordance with the invention. The determination of the percentage ratio for any given lime whereat the two curves therefor cross, indicates the best mixture of the two ingredients for providing an atmospheric-hydrate of substantially constant plasticity when subjected to variation in temperature.

Example I

The preparation of the mixture of the invention need be considered only from the completion of the atmospheric-hydration of any common dolomitic lime, the hydration process in accordance with any known means and known conditions providing a suitable starting material for producing the improved atmospheric-hydrate.

The atmospheric-hydrate, immediately following hydration, is divided into two portions, comprising respectively 25% and 75% thereof. The 25% portion is subjected to an effective period of ball-milling, in the order of thirty minutes, comprising continuously agitating a mixture of the atmospheric-hydrate and a large plurality of steel balls of in the order of ½ inch to 1 inch in diameter, the physical effect of which, on the atmospheric-hydrate, is not completely known. The 75% portion of the atmospherically-hydrated material is subjected to a reduction in particle size to substantially equal the particle size of the ball-milled portion. The particle size generally preferred is in the order of 95% through 30 mesh and 85% through 200 mesh. The reduction in particle size of the 75% portion is preferably produced by means of a Raymond-type high-speed hammer-mill.

The two portions are then blended, as by oppositely rotating twin screw mixers, such as a Broughton mixer or an open flight mixing conveyor, to provide the improved mixture of the invention.

The mixture of Example I provides an atmospheric-hydrate of soaking qualities completely equivalent to prior non-tube-milled atmospheric-hydrate, which when soaked has an Emley plasticity of over the required 200 at all practical temperatures, and which stays substantially constant at all practical temperatures.

Example II

A mixture is prepared in accordance with the method of Example I with the exception that a 5% portion is tube-milled and mixed with a 95% portion hammer-milled. This mixture, also of equivalent soaking properties, has a plasticity substantially higher than non-tube-milled regular atmospheric-hydrate when soaked and tested at 36° F., but still substantially lower than the plasticity of either when soaked and tested at 72° F. Thus, in view of the lower cost per unit weight of hammer-milling versus tube-milling, an improved atmospheric-hydrate is provided at lower cost, suitable where a lesser degree of stabilization of plasticity may be acceptable.

Example III

A mixture is prepared in accordance with the method of Example I with the exception that a 75% portion is tube-milled and mixed with a 25% portion hammer-milled.

This mixture when soaked and tested at either 36° F. or 72° F. has plasticities substantially higher than the mixture of Example I, and, thus, substantially higher than the plasticity normally required. The cost of the mixture of Example III is higher than that of Example I and the soaking quality, although still acceptable, is noticeably poorer.

Whereas the optimum stabilized mixture of the examples herein includes about 25% tube-milled atmospheric-hydrate, the proportion which will provide optimum stability will vary with variations in the raw materials, the time and manner of tube-milling, and other apparent variables in the ingredients and their handling. In accordance with the invention, markedly stabilized mixtures may be provided with from 5% to 75% tube-milled atmospheric-hydrate mixed with from 25% to 95% regular atmospheric-hydrate.

The reasons for the successful stabilization of the atmospheric-hydrate mixture, free of the unsatisfactory soaking properties of tube-milled atmospheric-hydrate cannot be explained. It will be seen, however, that a method is provided herein, which is susceptible of relative ease of control, which provides an improved atmospheric-hydrate of very substantial commercial value.

The term tube-milling will be understood to mean the subjection of material to a rolling or localized compressing action as best exemplified by tube, rod or ball-mills, which are well known in the art. A tube-milling process cannot be defined as to duration or required apparatus characteristics other than are well known, a minimum duration, dependent somewhat on the size of apparatus and quantity of material, being generally considered in the order of 15 minutes.

In addition to hammer-milling, any suitable means, other than tube-milling, such as a Bonnot or ring roll mill for reducing the particle size of the non-tube-milled portion of the atmospheric hydrate is considered in accordance with the invention.

Having completed a detailed disclosure of the preferred embodiment of my invention so that those skilled in the art may practice the same, I contemplate that variations may be made without departing from the essence of the invitation or the scope of the appended claims:

I claim:

1. The method of making an improved temperature-stabilized atmospherically-hydrated dolomitic lime comprising the steps of tube-milling from 5 to 75 parts by weight of atmospherically hydrated dolomitic lime to a particle size of approximately that in which 95% is passed through a 30 mesh screen and 85% through a 200 mesh screen, reducing the particle size of a quantity of atmospherically-hydrated dolomitic lime in a high speed hammer-mill to a particle size substantially equal to the particle size of the tube-milled product, and then mixing a quantity of the high speed hammer-milled product with the tube-milled product in an amount sufficient to form 100 parts of mixture which mixture is of a particle size in the order of that in which 95% is passed through a 30 mesh screen and 85% through a 200 mesh screen and with the mixture being proportioned to achieve plasticities of the mixture at 72° F. and 36° F. which are substantially identical.

2. The method according to claim 1 wherein the mixture comprises 25% of tube-milled product and 75% high speed hammer-milled product.

References Cited in the file of this patent
UNITED STATES PATENTS

| | | |
|---|---|---|
| 2,016,986 | Case | Oct. 8, 1935 |
| 2,663,647 | Huntzicker | Dec. 3, 1953 |